(12) United States Patent
Dokkedahl

(10) Patent No.: US 7,380,699 B2
(45) Date of Patent: Jun. 3, 2008

(54) METHOD AND APPARATUS FOR VAPOUR PHASE SOLDERING

(75) Inventor: Lars Dokkedahl, Abyhoej (DK)

(73) Assignee: Vapour Phase Technology ApS, Aabyhoej (DK)

( * ) Notice: Subject to any disclaimer, the term of this patent is extended or adjusted under 35 U.S.C. 154(b) by 79 days.

(21) Appl. No.: 10/517,815

(22) PCT Filed: Jun. 14, 2003

(86) PCT No.: PCT/DK03/00393

§ 371 (c)(1),
(2), (4) Date: Dec. 14, 2004

(87) PCT Pub. No.: WO03/106093

PCT Pub. Date: Dec. 24, 2003

(65) Prior Publication Data

US 2005/0173497 A1 Aug. 11, 2005

(30) Foreign Application Priority Data

Jun. 14, 2002 (DK) .............................. 2002 00906
Feb. 21, 2003 (DK) .............................. 2003 00260

(51) Int. Cl.
*B23K 31/00* (2006.01)
*B23K 37/00* (2006.01)

(52) U.S. Cl. ................. 228/234.2; 228/33; 228/42; 228/219

(58) Field of Classification Search ............... None
See application file for complete search history.

(56) References Cited

U.S. PATENT DOCUMENTS

| 3,386,166 A | | 6/1968 | Tardoskegy | |
| 4,264,299 A | * | 4/1981 | Ammann et al. | ............. 432/13 |
| 4,321,031 A | | 3/1982 | Woodgate | |
| 4,367,639 A | * | 1/1983 | Kantor | ........................ 62/499 |
| 4,580,716 A | | 4/1986 | Barresi et al. | |
| 4,628,616 A | * | 12/1986 | Shirai et al. | ................... 34/78 |
| 4,679,721 A | * | 7/1987 | Kondo | ........................ 228/40 |

(Continued)

FOREIGN PATENT DOCUMENTS

| JP | 4-356353 A | 12/1992 |
| JP | 6-188555 A | 7/1994 |

*Primary Examiner*—Kiley Stoner
(74) *Attorney, Agent, or Firm*—David S. Safran

(57) ABSTRACT

The present invention concerns a method and an apparatus for performing soldering of items that are applied a soldering agent, where the soldering apparatus includes at least one soldering zone, where the soldering zone include means for generating vapor, the apparatus being adapted to heat the items to be soldered to a temperature required for soldering by condensing the vapor. Further the invention relates to a method and an apparatus for flux deposition connected to a soldering machine, which soldering machine comprises a solder heating medium evaporated by heating means forming a vapor that heats elements to be soldered by heat transfer and by condensation, which apparatus comprises means for condensation, of a vapor containing flux where pumping means circulate vapor containing flux through the condensation means, where the condensation means comprises heat exchangers for cooling the vapor for flux condensation.

22 Claims, 8 Drawing Sheets

U.S. PATENT DOCUMENTS

Figure 3:
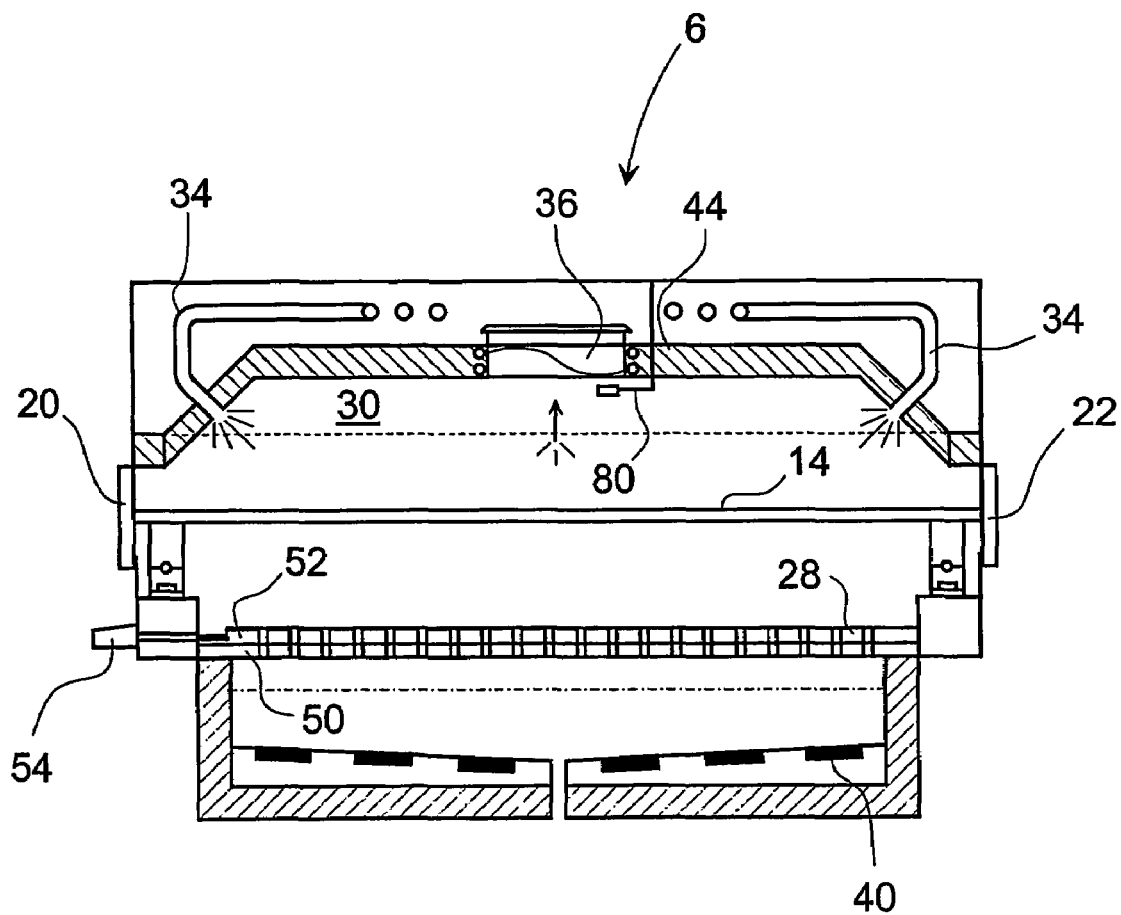

| | | | |
|---|---|---|---|
| 4,838,476 A * | 6/1989 | Rahn | 228/180.1 |
| 5,038,496 A | 8/1991 | Mishina et al. | |
| 5,156,325 A * | 10/1992 | Mishina et al. | 228/219 |
| 5,181,648 A * | 1/1993 | Leicht | 228/201 |
| 5,514,414 A | 5/1996 | Gao et al. | |
| 5,611,476 A | 3/1997 | Soderlund et al. | |
| 6,116,497 A * | 9/2000 | Scheel et al. | 228/234.2 |
| 6,382,500 B1 * | 5/2002 | Master et al. | 228/180.1 |

* cited by examiner

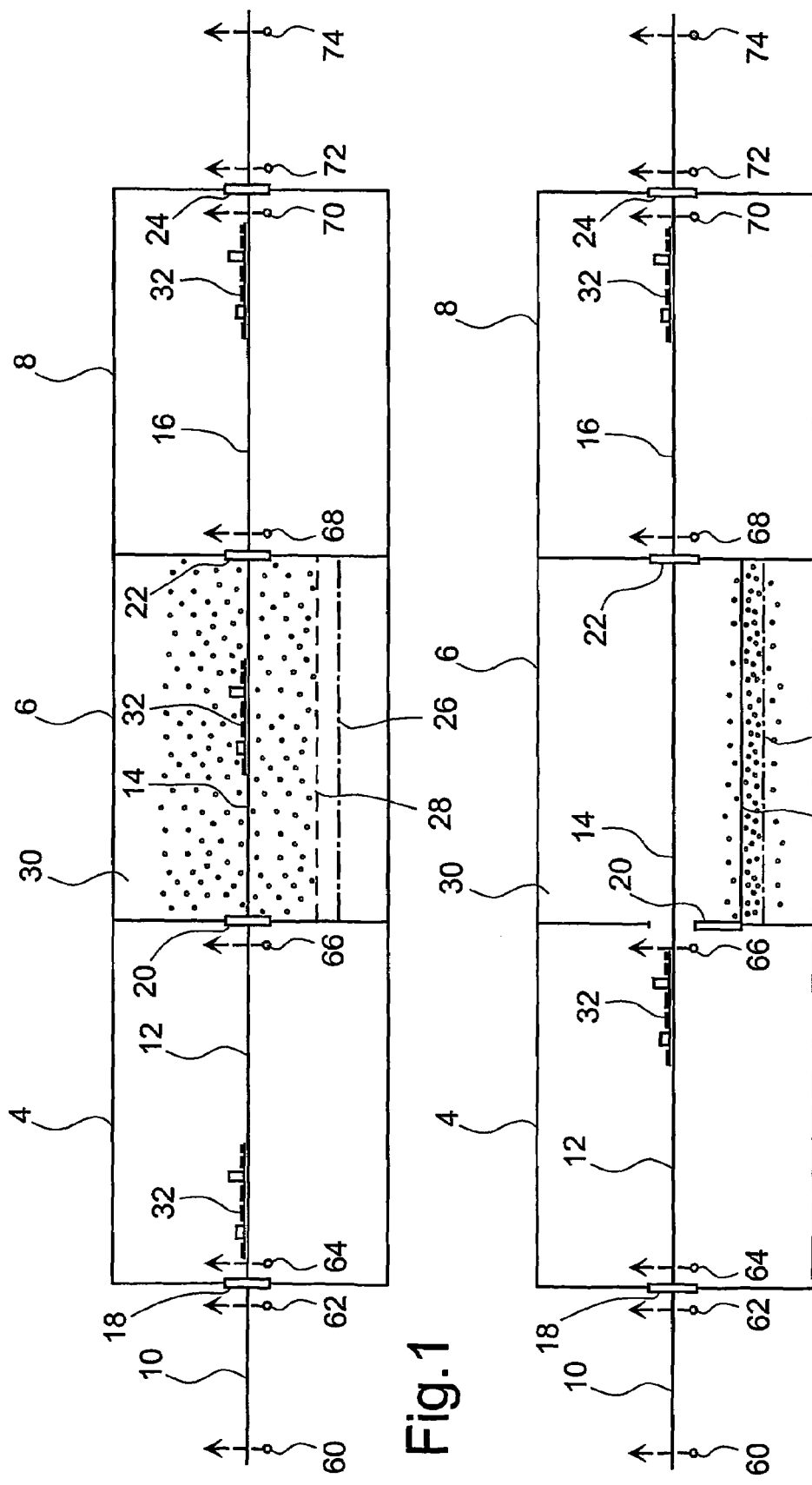

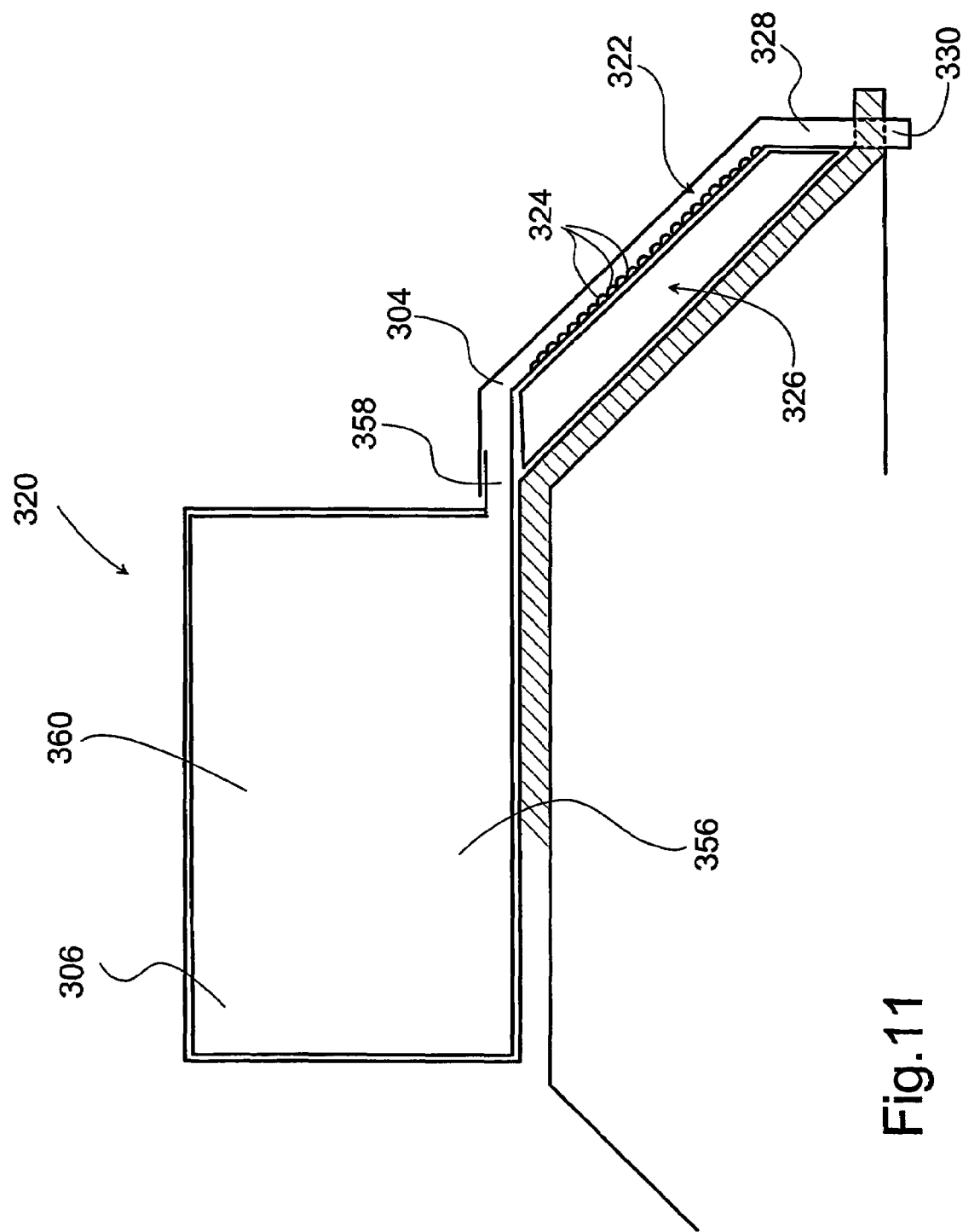

METHOD AND APPARATUS FOR VAPOUR PHASE SOLDERING

The present invention relates to a method and an apparatus for performing soldering of items that are applied a soldering agent, where the soldering apparatus includes at least one soldering zone, where the soldering zone includes means for generating vapour, the apparatus being adapted to heat the items to be soldered to a temperature required for soldering by condensing the vapour, and where the soldering zone includes gates.

The invention also relates to an apparatus for flux deposition connected to a soldering machine, which soldering machine comprises a solder heating medium evapourated by heating means forming a vapour that heats elements to be soldered by heat transfer and by condensation, which apparatus comprises means for condensation, of a vapour containing flux where pumping means circulate vapour containing flux through the condensation means, where the condensation means comprises heat exchangers for cooling the vapour for flux condensation.

The present invention also relates to a method for flux deposition in conjunction with vapour phase soldering, where a solder heating medium is evapourated by heating forming a vapour, which vapour heats elements to be soldered partly by condensation to a temperature above a soldering temperature, which leads to soldering of elements, which soldering process leads to evapouration of flux and other chemical substances.

U.S. Pat. No. 5,181,648 discloses a vapour phase soldering apparatus structured as several sections, where gates are provided at the transition between the sections so that different closed compartments are provided in which the individual subprocesses occur. There is used a complicated conveyor mechanism, as items to be soldered are submerged in a vapour phase over a vessel in which vapour is generated, why the items are to perform a vertical movement down into the vessel and to stay at the bottom of the vessel until the conveying means in the form of a conveyor transports the items vertically upwards and further on through a flushing facility.

The relatively complicated conveying means, however, makes the disclosed method less applicable for mass production of large series of print boards, and there are limits to how large panels that can be soldered.

U.S. Pat. No. 4,838,476 also concerns a soldering apparatus of the vapour phase type, where soldering items are transported by a complicated conveyor device, down into and up from a vessel containing a liquid in vapour phase. In order to avoid loss of heat as well as liquid there are gates providing a phase division in the apparatus.

U.S. Pat. No. 4,580,716 describes a solder reflow process including vapourized fluorinated organic liquid such as FC-70 is dehumidified by pressurizing the vapour chamber with dry nitrogen and blowing the dry nitrogen against the conveyor belt and article to be soldered as they pass through the inlet throat. Inlet of nitrogen into the vapour chamber is pressing vapour through the coils and out in the inlet and outlet, from where vapour is lost.

DE-C2-196 15 337 discloses a method for making a vapour-free climatic zone above a vapour level in a vapour phase soldering apparatus. In order to ensure transparency in the upper part of the apparatus so that a camera can view the items during the soldering, a gas is injected for achieving partly condensation, where this gas either may be usual air or an inert gas. The blowing in of this gas will, however, be unfavourable and is to be controlled effectively in order not to put down the vapours so much that soldering cannot be effected.

U.S. Pat. No. 6,382,500 describes a semiconductor soldering device. In a solder reflow furnace, flux is vapourized and carried to the furnace exhaust pipe. The flux condenses on the walls of the exhaust pipe and drips back into the furnace thereby contaminating production parts. A solder reflow furnace with a flux effluent collector prevents flux drip-back. The flux effluent collector has an exhaust gas heater that maintains flux effluent in a gaseous state, a flux cooler, to subsequently condense flux, and a flux condensation region where the flux condenses. The flux condensation region is offset from the furnace's exhaust opening so that condensed flux cannot drip back into the furnace.

U.S. Pat. No. 5,611,476 describes a solder reflow convection furnace employing flux collection and heating to minimize flux and solvent build up and gas densification to reduce input gas flow. As solder melts in the furnace, an effluent of vapourized flux is driven off and can condense on cooler components. To minimize such condensation, the gas is directed through a cooling system in which the flux condenses, and the cooled, purified gas is directed into the furnace's product cooling section. In another embodiment, in which the gas in the furnace is recirculated, a cooling coil is located upstream of the recirculating gas mover to heat the primary gas. The vapourized flux condenses on the cooling coil, which can be readily removed and replaced. In another aspect of the invention, in which furnace employs a gas amplifier, the recirculating gas is cooled prior to reentry into the heating chamber, which increases its density and removes flux by condensation.

The above documents describe inventions by which it is possible to remove flux from a furnace in which a solder process takes place. Used in combination with infrared reflow soldering, removing of flux takes place in an efficient way. But used in vapour phase reflow soldering furnaces, where a solder heating medium is evapourated by heating means forming a vapour that heats and solder electronic boards by condensation of the vapour, the vapour is drawn out of the furnace. By contact to the cooling surfaces in the cooling system, the vapour is caused to condense together with the flux, thereby forming a mixture of liquid solder heating medium and liquid flux. It is important that separation of liquid flux and liquid solder heating medium takes place in such a way that solder heating medium is not lost.

It is the object of the invention to achieve a method and an apparatus for condensation soldering of items, where the soldering may occur at minimal environmental load by minimising the loss of condensing vapour used for soldering. Also, it is an object of the invention to achieve solderings with high quality, where oxidation is reduced optimally while the soldering occurs. Another scope of this invention is to remove flux from a vapour phase solder furnace without losing solder heating medium.

This may be achieved if the soldering zone contains a protective gas, if the soldering zone includes means for shutting off the vapour generating means, and if the soldering zone is adapted for supplying means for forced condensing of condensing vapour at the end of a soldering process.

Hereby may be achieved that a soldering zone remains isolated from the surroundings in the period of time in which vapour is generated so that this vapour will not have any possibility of evading out of the soldering zone. The content of protective gas may simultaneously imply that the oxygen possibly contained in the soldering zone before vapour generation starts has been displaced long ago, whereby the oxygen content, possibly by flushing with a protective gas, may be reduced considerably, and while this flushing occurs, the vapour generating means may be shut off, after which opening the vapour generating means provides build up of a condensing vapour zone in the soldering zone of the soldering apparatus, whereby items to be soldered are heated by the condensing vapour. Since the vapours have a temperature exceeding the melting point of a soldering agent, a temperature on the soldering items is made so high that soldering is started on the soldering items. When the soldering process is expected to finish, i.e. when the soldering item has had the desired temperature for a predetermined time, there is no longer use for the hot vapours, and the vapour generating means may be shut off, after which a protective gas may be introduced in the soldering zone, inducing forced condensing of vapours. When this forced condensing is advanced, a item to be soldered may be removed automatically through a gate by a conveyor belt performing transport to the succeeding zone. Thus there may be performed soldering where the heating gas remains in the soldering zone and where the items at a time when heated in proximity of the soldering temperature are exposed to condensing vapours and protective atmosphere only. Thereby oxidation is reduced optimally.

Advantageously, a soldering process may take place by supplying a protective gas to the soldering zone through ducts suited for this purpose, where the supply of protective gas may occur in dependence of measurement of the actual oxygen content in the soldering zone.

The soldering zone may contain means for pressure regulation, where suction facilities may remove an amount of gas from the soldering zone corresponding to the supplied amount of protective gas. Hereby may be achieved that a substantial pressure increase in the soldering zone does not occur and simultaneously also that a substantial vacuum does not occur either which possibly may suck further oxygen into the soldering zone through leakages. In order to reduce the content of oxygen in the soldering zone and in the solder paste the pressure can be reduced before a protective gas is led to the soldering zone so that the protective gas is drawn into the soldering zone, and afterwards vapour is drawn into the soldering zone, where the soldering process take place near normal pressure.

The oxygen content in the soldering zone may be kept under a predetermined minimum value while the soldering occurs. Hereby may be achieved that injection of protective gas may be reduced and may be stopped completely in the period in which the soldering process occurs, but if the oxygen content in the course of the process is increased for some reason, one will have the possibility of reducing the oxygen content by additional supplying of protective gas.

At the end of a soldering process, protective gas at a temperature lower than the soldering temperature may be supplied to the soldering zone in order to achieve forced condensing of vapours. Hereby may be achieved that the condensing vapours are removed from the soldering zone in a short time as the temperature in the entire soldering zone is reduced. This reduction of temperature is, however, to be effected in consideration of the soldering item, which is not to be cooled abruptly under any circumstance as this may be detrimental for electronic components, but even with a limited supply of temperate protective gas, rapid condensation of vapours will be obtained so that the soldering zone is rapidly freed from condensing vapour as the condensing vapour is rapidly transformed into liquid, which is collected. An almost pure protective, ambient atmosphere is thus attained around the items, after which a conveyor belt may move the items into the next zone through a suitable gate which is opened and subsequently closed.

At the end of a soldering process, the soldering zone may be supplied with protective gas at a first high temperature, where the temperature is approached a second lower temperature over a period of time. Hereby may be achieved controlled cooling of the items to be soldered. The first temperature may be close to the soldering temperature. By gradually lowering the temperature in the protective gas, condensing of the condensing vapour occurs gradually, and no abrupt cooling occurs. The entire cooling of items may effectively be controlled by regulating the temperature of the protective gas.

The soldering zone may contain a vessel heated by at least one heating element, where the vessel may be covered by means for shutting off including perforated plates that are mutually displaced by at least one actuator. Hereby may be achieved that the vessel effectively may be shut off by perforated plates so that vapours are prevented from rising up into a process chamber. Under the closed plates vapours are released, which, as soon as the plates are moved to the open position, penetrate to the overlying soldering process chamber which is heated up. The use of reduced pressure in the process chamber is decreasing the time of forming a vapour phase in the process chamber, where a circulation inside the process chamber leads to a uniform heating.

The means for shutting off the vessel may advantageously be closed until the start of a soldering process where at least one heating element may be activated at the start of the soldering process simultaneously with the means for shutting off the vessel are opened. Hereby may be achieved that the power supply in the vessel is increased at the moment the means for shutting off are opened. Thereby, the vapour formation may be reduced at times where no soldering is taking place and be increased when the need for heating power is the greatest.

At the end of the soldering process, the means for shutting off the vessel may be closed simultaneously with the means for heating are switched off. As previously mentioned, formation of vapours is hereby reduced at times when there is no need therefor.

Advantageously, the soldering apparatus may include a preheating zone, where soldering items may be preheated to a predetermined temperature, where the soldering apparatus may include at least one gate, and where the preheating zone includes at least a second gate at its entrance. Hereby may be achieved a gradual heating of items to be soldered which is essential for electronic components, where ceramic capacitors in particular cannot stand sudden changes in temperature. At the same time, the time items are to stay in the soldering zones is reduced so that the capacity of the soldering apparatus is increased.

Advantageously, the soldering apparatus may include at least one cooling zone, where the apparatus includes at least on gate between soldering zone and cooling zone, where the cooling zone includes at least one gate at the exit. Hereby may be achieved that a cooling zone performs slow cooling of items in order to avoid stressing of possible electronic components.

Advantageously, the soldering apparatus may contain means for determining the position of the items to be soldered, where the opening and closing function of the gates of the apparatus are determined from the position of the items and the actual conditions in the zones of the soldering apparatus. Hereby may be achieved a conditioned opening of the gates of the soldering apparatus, where the conveyor systems of the apparatus may be adapted for only performing conveying to a position measurement and to wait there, if, for different reasons, there is no possibility of opening the next gate. Hereby may be constructed a very flexible apparatus that may operate automatically, where items in the form of e.g. printed circuit boards may run through the apparatus in a continuous flow, though interruptions in the operation may arise due to different causes, which are relieved automatically as the gates remain closed and the conveyor belts are stopped.

With this apparatus, pumping means are stopped during the soldering process, and started upon ending a solder process. The pumping means operate in a closed circuit starting at an outlet from the soldering process and ending at an inlet to the soldering process. The closed circuit may comprise at least a first heat exchanger operating at a first temperature, and at least a second heat exchanger operating at a second lower temperature, where the heat exchangers can be placed in conjunction with liquid collecting means. In this way it can be achieved that the two condensation processes can take place in heat exchangers where the condensation does not necessarily take place with energy losses to the surroundings, because the energy delivered from the heat exchangers can be used in the soldering process for preheating of printed circuit boards before the boards enter the soldering zone. This preheating is necessary for avoiding temperature shocks during the soldering process.

A protective gas may be mixed with the vapour during the soldering process. The presence of a protective gas reduces oxidation during the soldering process. As is known, oxidation may occur not only on the soldering material but also the in the evapourated flux. Oxidation is undesirable because it often leads to the formation of carbon particles. Likewise, the presence of protective gas prevents the components on the printed circuit boards from being oxidized during the soldering process. The use of the protective gas could also lead to the use of a soldering paste containing only a very limited amount of flux. In the future it should also be possible to perform entirely flux-free soldering if the soldering takes place in an environment with protective gas.

The closed circuit may also comprise at least one heat exchanger for heating protective gas to a temperature below the condensing temperature of the vapour before the protective gas is returned to the soldering device in a time periods after soldering is finished. Preheating of the protective gas is important in order to avoid temperature shocks on printed circuit boards. Especially ceramic capacitors are very sensitive to large temperature fluctuations, and cracks in the ceramics can change to capacitors to resistors in a few hours. However, by heating the protective gas to 150° C. for example, the temperature shock is reduced to less than 50° C. However, this temperature is sufficiently low for condensation of the vapour of the solder heating medium. Thus by pumping in preheated protective gas in a rather fast manner, the vapour is removed in only a few seconds.

Liquefied solder heating medium can be returned from the liquid collecting means through a conduit to a flux trap comprising steps, which flux trap is cooled by cooling means to a first condensation temperature and further cooled to a second lower temperature for flux liquefying. By using a flux trap made of a large number of small steps, the temperature can be reduced from step to step. The liquid solder heating medium passes the steps, and the temperature is gradually reduced. In this way the content of liquid flux is solidified and by forming the steps at a negative angle, liquefied particles will be collected in the steps and can later be mechanically removed by cleaning of the equipment. Depending on the kind of flux used, the temperature can be reduced to a very low level, maybe as low as 20° C., but because of the necessary re-heating of the medium, the temperature will be reduced to exactly the temperature at which all the flux is liquefied, thereby saving energy.

The heat exchangers may comprise cooling fins that are tilted against the inlet direction in order to return liquefied solder heating medium and liquefied or solidified flux, in which the protective gas can pass over and around the fins. The tilted position of the fins is efficient for collecting heavy flux particles whereby small drops of flux heat the fins by which the fins are further cooled, and liquid flux flows downwards on the fins opposite the flow direction. From the fins, the flux can fall down as droplets. The surface of the fins can be made in such a way that there are no fixation points at all for liquid flux to adhere to so that the liquid flux will automatically start flowing backwards by way of gravity as soon as droplets exceeding a certain size are formed. Thus the fins are self-cleaning.

Liquefied solder heating medium and liquefied or solidified flux can pass through filter means before reaching collecting means, which filter means can collect liquid or solidified flux and other chemical substances. By letting all the liquids that leave the heat exchangers pass through filters, a large part of the flux will be collected in these filters, and the filters can afterwards be cleaned and reused in the soldering machine.

Liquid solder heating medium can be collected at the surface of a tray placed under the soldering zone and led over the flux trap. Here by is achieved that also flux that has reached the boiling tray under the soldering zone can be collected in the flux trap. Liquid solder heating medium is pumped to the flux trap in periods the flux trap has free capacity, whish occur in periods between solder processes. After passing the flux trap the solder heating medium is returned to the tray where heating elements are heating the solder heating media for forming vapour.

Surfaces on elements in contact with flux might be coated with a material having ability not to fix liquid or solidified flux. In this way flux is removed from the surfaces primarily by liquid solder medium flowing back passing the liquid trap or the flux is ending in the tray under the soldering zone, and from here the solder heating medium is colleted and led over the flux trap.

The pressure in the soldering zone can be reduced at the beginning of a soldering process, where the pressure is partly normalised by opening a valve for supply of protective gas into the soldering zone, where the pressure in the soldering zone is normalized by opening for supply of vapour. In this way at first oxygen is drawn out from the soldering zone. Afterwards the protective gas is added so the oxygen is partly replaced by the protective gas, which might be important for the reduction of oxidisation during the soldering process. If the pressure is reduced the vapour can very fast fill the volume of the soldering zone after opening the valve placed over the vapour generating means. After the soldering process the vapour is drawn out from the soldering zone through condensing means, from which the liquefied vapour is led back through flux filtration means to vapour generating means.

The invention also concerns a method where the soldering process step is effected in the presence of a protective gas, and that the second step includes shutting off the supply of vapour and forced condensing of vapour. Hereby may be achieved solderings with good quality as oxidation may be completely avoided, and since the condensing vapour may be put down and since further supply of condensing vapours may be shut off, soldering largely without loss of condensing vapour may be achieved, where possible suction facilities in connection with the soldering apparatus may include special means for forced condensing of condensing vapour, whereby even small amounts of condensing vapours may be recovered, which might comprise the use of under pressure and recirculation through condensing means.

Supply of protective gas may be used as means for forced condensing of the condensing vapours. Hereby may be achieved that the soldering zone is filled with protective gas as soon as a soldering process has been performed, whereby a commencing drop in temperature results in solidifying of soldering agent, and a commencing cooling of the items. The condensing vapour is transformed into a liquid which is collected. Gates for preheating zone and cooling zone may be opened subsequently without loss of the condensing vapour, and only the protective gas has possibility of evading through the open gates.

This can be achieved by a method as described in the introduction, which method is modified in such a way that vapour of solder heating medium containing flux and other chemical substances is drawn into a closed circuit in time periods between and after soldering processes, where the closed circuit comprises at least a first condensation process and a second condensation process, which first and second condensation processes take place at a first high and a second lower temperature, and liquid solder heating medium is returned to the vapour phase soldering process.

Hereby it can be achieved that after completion of a soldering process where, for example, a printed circuit board has been fully soldered, the flux, which was contained in the soldering paste placed on the board, to a large extent is evapourated and consequently mixed up with the solder heating medium. Thus after completion of the soldering process, a mixture of flux and solder heating medium is sucked out of the soldering chamber and into a closed circuit in which purification of the solder heating medium takes place. This purification is done by removal of the flux content from the mixture by passing it through condensation means, where condensation at a first high temperature takes place by which most of the flux contained in the mixture is condensed. In this first condensation process, the solder heating medium itself is also partly condensed. The liquid substance resulting from the condensation process drips down from the condensation means and into a collector part thereby conducting the rest of the solder heating medium, which still may contain a small content of flux, to a second condensing means where the condensation takes place at a lower temperature than in the first condensation process. It is ensured that almost all solder heating medium is condensed in that the temperature of the condensation process is lower than the boiling temperature of the solder heating medium. The result of this process is that that most of the flux that has evapourated during the soldering process is now collected inside a closed circuit and as such totally removed from the soldering process.

The first high condensation temperature depends on the condensation temperature of the flux, whereas the second lower temperature depends on the condensation temperature of the solder heating medium. If it is possible to define the exact condensation temperature of the flux, it will be possible to effect almost full condensation of flux at the first condensation temperature. If the difference between the condensation temperature of the solder heating medium and the condensation temperature of the flux is sufficiently high, it is possible to fully separate the two gases into different liquids. In practice, however, the flux has a very complex composition where the condensation can take place over a relatively large temperature range. Probably both flux and solder heating medium will be condensed at the second (lower) condensation temperature.

The method may also comprise the use of a protective gas during the soldering process, which protective gas is mixed with the vapour. The use of the protective gas is important during the soldering process because the protective gas prevents oxygen from getting into contact with the melted solder. But also before melting of the soldering material, the temperature is high. If solder paste is used, which may have a relatively large surface, oxidation may start already during the preheating of the devices to be soldered. The protective gas will be mixed with the vapour of the solder heating medium during the whole process. After completion of the soldering process, vapour continues to be drawn out of the chamber, and the mixture of flux, vapour of the solder heating medium and protective gas is led through the condensing units. The condensing units will remove flux and solder heating medium and leave almost purified protective gas.

The protective gas can be heated by heating means to a temperature below the condensation temperature of the vapour after it has passed through the condensing processes and before the protective gas is returned to the soldering chamber. The condensing processes and the heating process take place in time periods before and after soldering of the elements. If the protective gas just is returned to the soldering zone without any heating, the newly soldered printed circuit boards may suffer temperature shocks. To avoid temperature shocks, the protective gas is heated afterwards to a temperature slightly below the condensation temperature of the solder heating medium. This leads to condensation of the vapour in the soldering zone, but with only limited cooling effect on the printed circuit boards. The condensation of the vapour occurs rapidly, so in only few seconds all vapour in the soldering zone has been condensed and will fall down to the bottom as drops. Seen from the outside, it looks as if the vapour is rapidly lowered to a level below the printed circuit board. Afterwards can the printed circuit board be removed from the soldering zone through a door. In this way it is achieved that most of the solder heating medium is removed from the soldering zone at the time when the door is opened, and only very limited amounts solder heating medium are lost to the environment.

The condensed heating medium can be returned to the soldering process through a flux-depositing trap comprising cooling means for further flux condensation and flux solidification. This provides a very efficient removal of flux contained in the liquid solder heating medium, especially if the temperature is caused to fall gradually during a flow path for the liquid. By placing a large number of steps that the liquid has to pass, solidified flux will be collected on the steps and may adhere to the surfaces as solidified particles which can manually be removed later. The end result is a liquid solder heating medium from which all flux particles have been removed. This solder heating medium is subsequently returned to the boiling equipment placed under the soldering chamber in which the solder heating medium is reheated.

Figure 4:
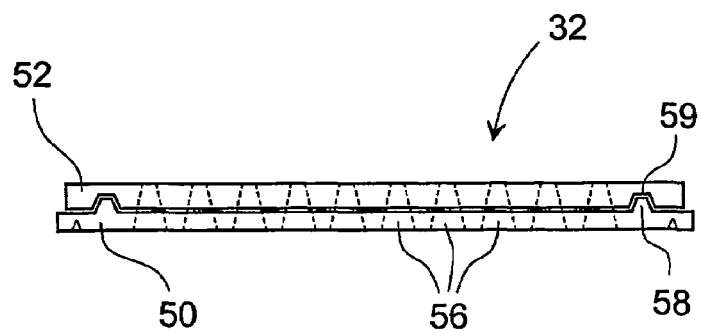
Figure 5:
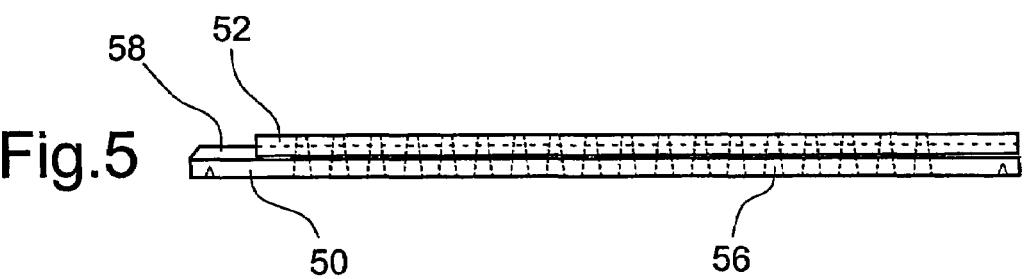
Figure 6:
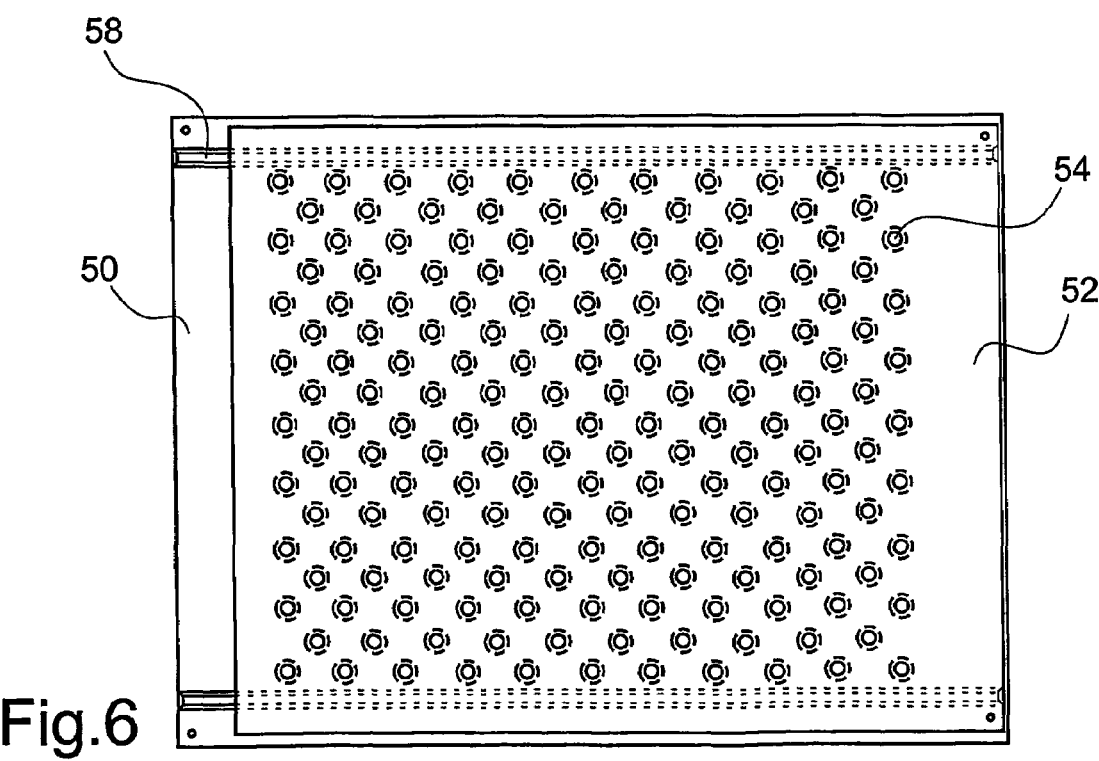
Figure 7:
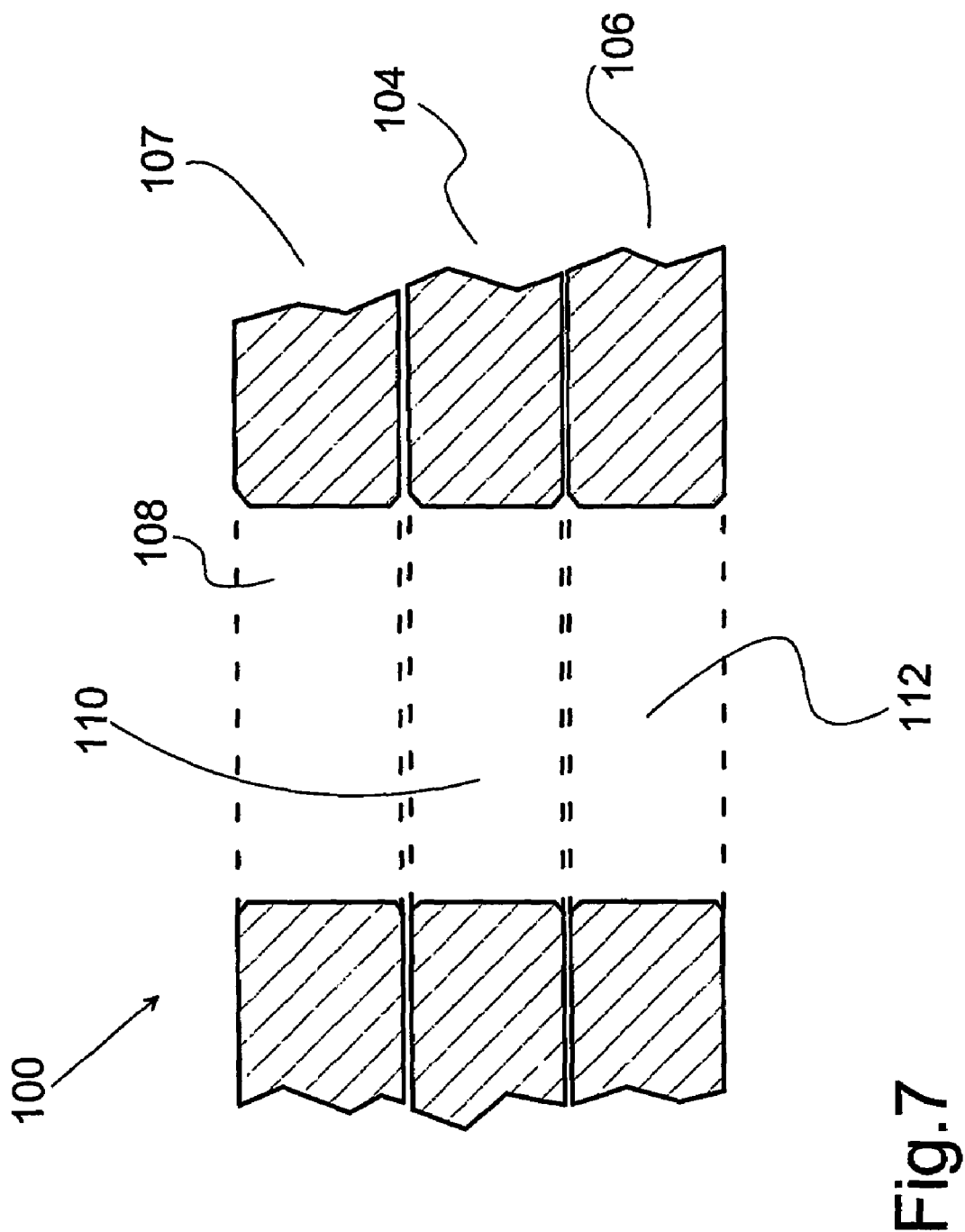
Figure 8:
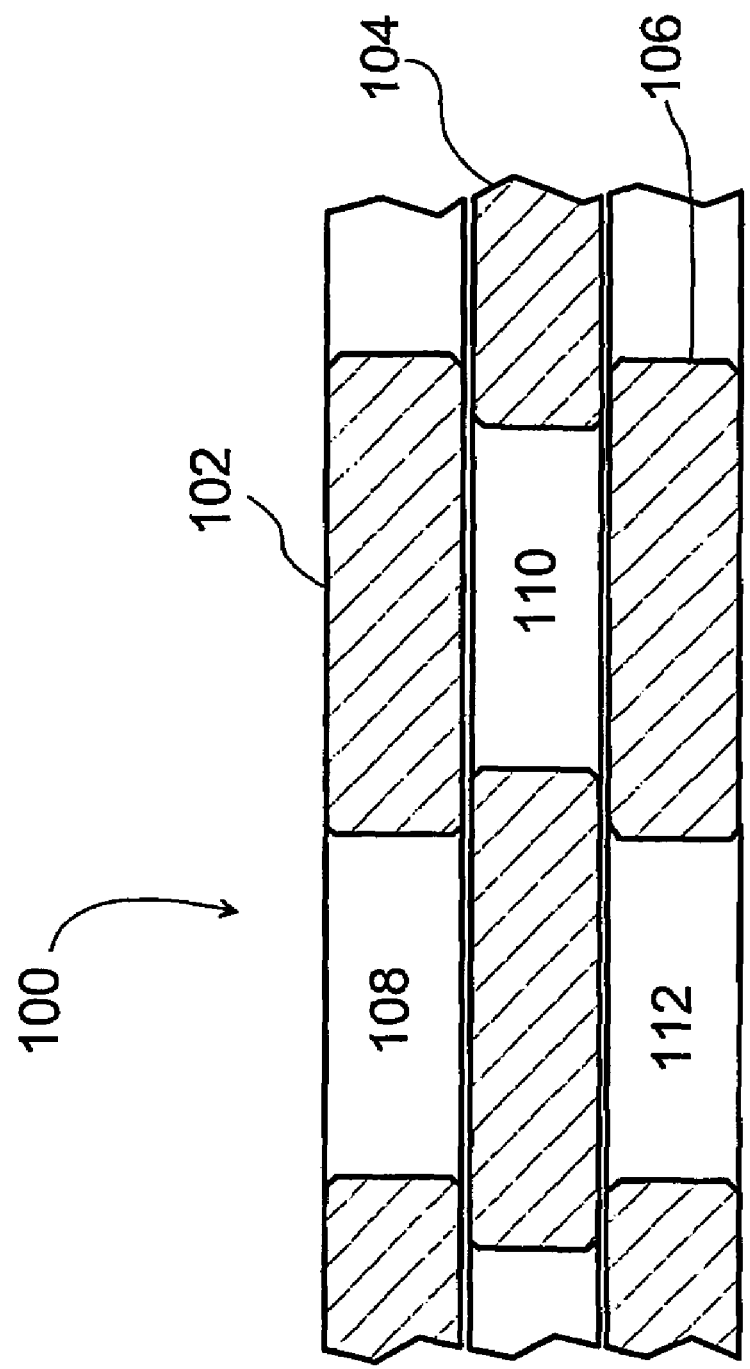
Figure 9:
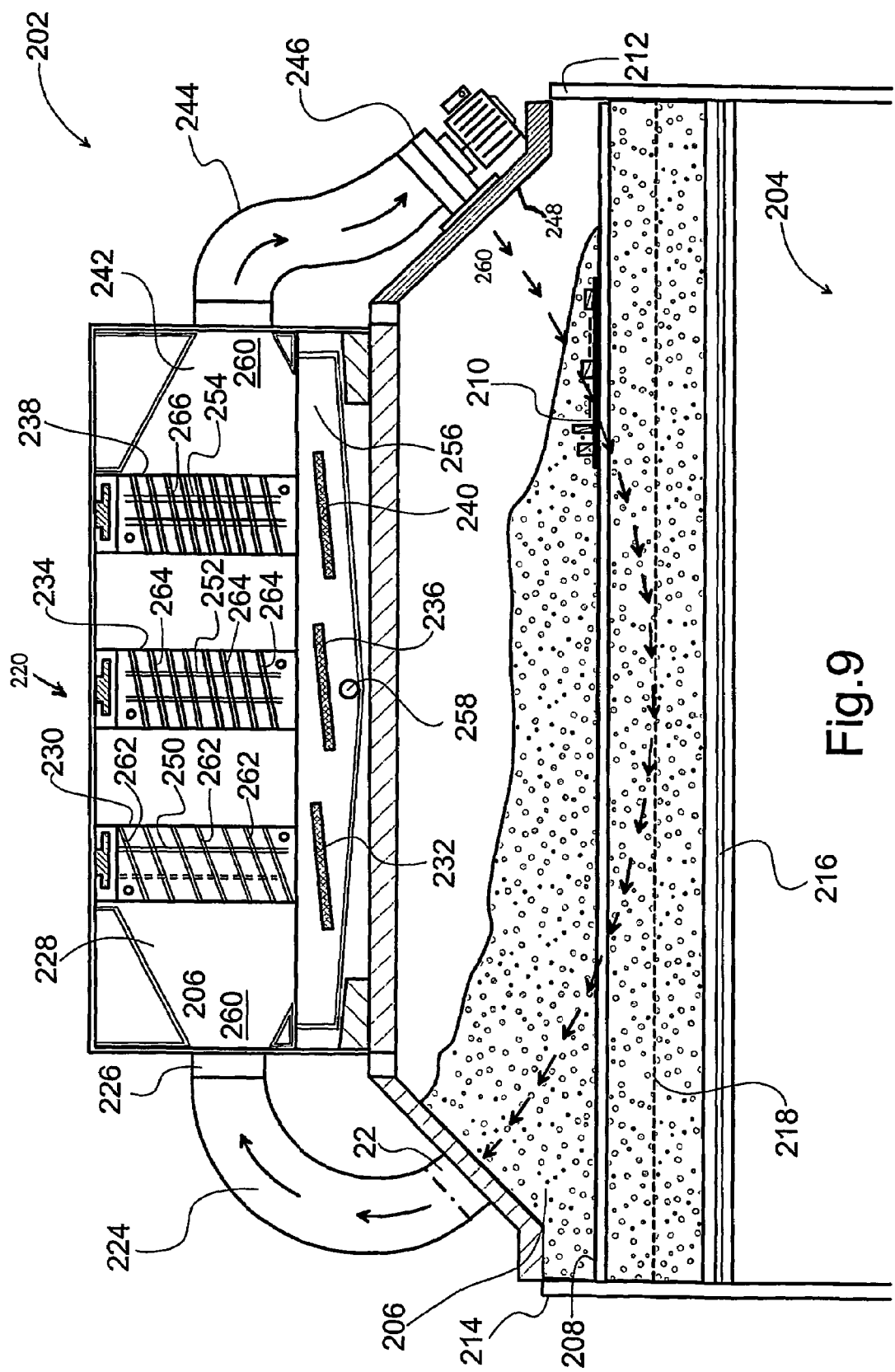
Figure 10:
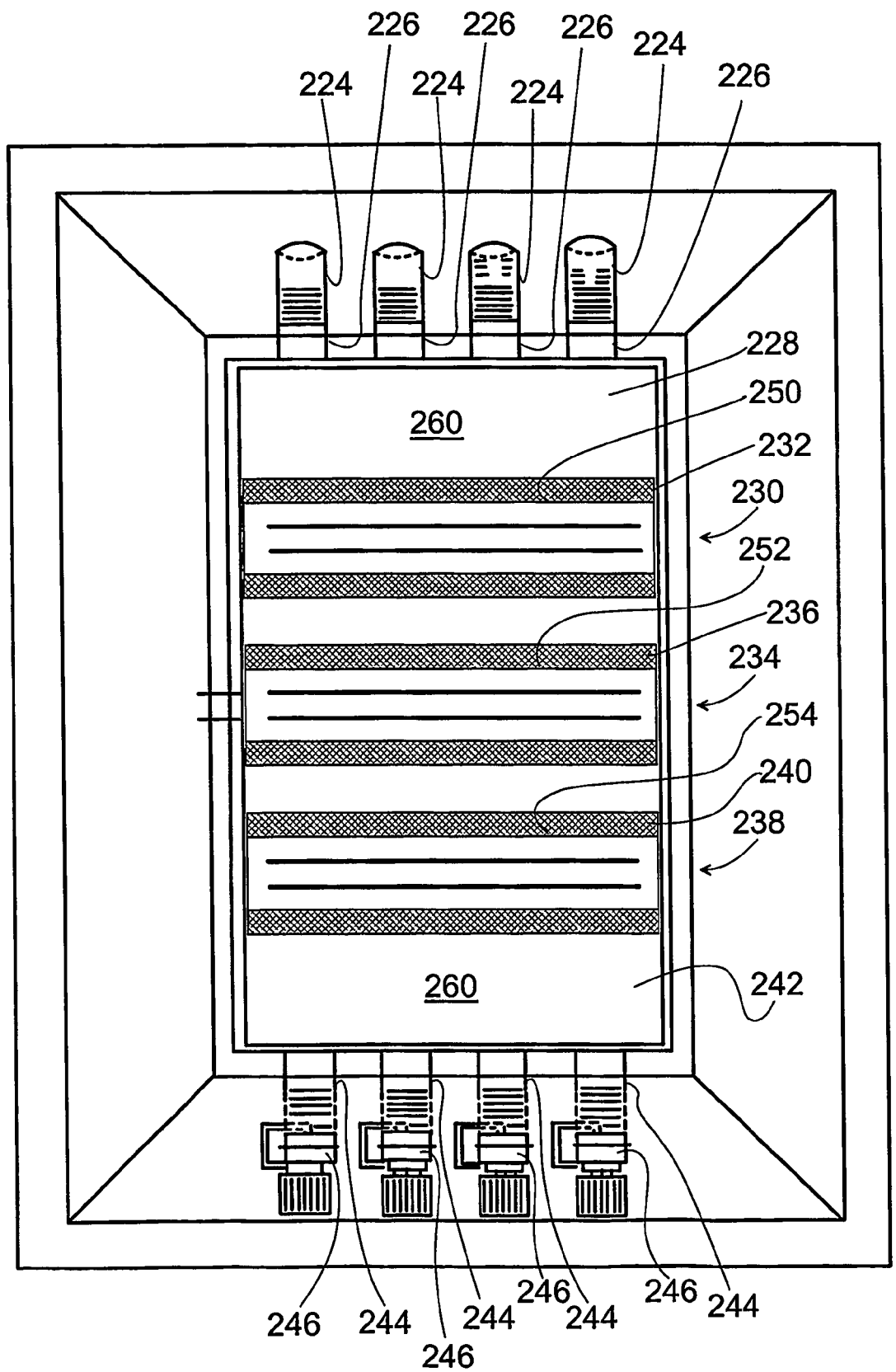

In the following, the invention is explained with reference to the drawing, where:

FIG. 1 shows a schematic drawing of a possible embodiment of a soldering apparatus according to the invention, FIG. 2 shows the same as FIG. 1, but with an open gate, FIG. 3 shows an embodiment of a soldering zone, FIG. 4 shows an embodiment of a shutting device as seen from a first side, FIG. 5 shows the same as FIG. 4 but from another side, FIG. 6 shows the same embodiment as FIGS. 4 and 5, but seen from above, FIG. 7 shows a cut through a possible embodiment of a shutting device, FIG. 8 shows the same embodiment as FIG. 7, but with the valve mechanism closed, FIG. 9 shows a cross-section of a soldering zone comprising a device according to the invention, FIG. 10 shows a partly opened top view of a soldering zone comprising a device according to the invention, and FIG. 11 schematically shows a flux trap.

The soldering apparatus 2 includes a preheating zone 4, a soldering zone 6 and a cooling zone 8. A first conveyor 10 is provided before the preheating zone 4, whereas the preheating zone contains a second conveyor 12, the soldering zone 6 contains a third conveyor 14 and the cooling zone 8 contains a fourth conveyor 16. At the entrance of the preheating zone 4 is disposed a gate 18, between preheating zone 4 and soldering zone 6 a gate 20, between soldering zone 6 and cooling zone 8 a gate 22, and between cooling zone 8 and the surroundings a gate 24. A vessel 26 containing the condensing gas in liquid state is shown below means 28 for shutting off the vessel 26, where the soldering zone above contains a protective gas 30. In the preheating zone 4 is shown a soldering item in the shape of a printed circuit board 32 lying on a conveyor 12, and a number of position sensors 60-74 are used for determining the position of the items and for opening and closing the gates 18-24.

When starting, an item to be soldered 32 may be placed on a conveyor 10, either manually or automatically, after which a position sensor 62 opens the gate 18, after which the soldering item 32 moves into the preheating zone, where gradual heating occurs, so that jumps in temperature are avoided, until a temperature which is lower than the soldering temperature to which the printed circuit boards are later exposed. The preheating may be effected with infrared light or by supplying hot air. The conveyor 12 performs a gradual, advancing movement of the soldering item 32 until the item 32 comes into contact with a position sensor 66. If the soldering zone 6 is ready for receiving the next soldering item, the gate 20 is opened, and the item 32 is moved into the soldering zone 6, after which the gate 20 is closed. In the first place, preparation for performing the soldering process will take place by flushing of the atmosphere, as additional amounts of protective gas 30 are supplied to the soldering zone, possibly controlled by a sensor, so that the flushing process is continued until the oxygen concentration is below a predetermined value. When the desired oxygen concentration is attained, the shutting means 28 are opened, and vapours formed in the vessel 26 rise up and heat the item 32 to be soldered. The item 32 has a temperature which is substantially lower than the vapours, whereby a beginning condensing of the vapours passing up around the item 32 occurs. Energy is deposited by the condensation, thus inducing a gradual heating up of the item 32, possibly at the same time as the conveyor 14 moves the soldering item forward through the soldering zone 6. At a point of time, the soldering temperature is reached on the items 32, and the soldering process is initiated. This process occurs in the course of relatively few seconds, but the temperature is maintained over a predetermined period of time in order to ensure complete soldering on relatively heavy components. When the soldering process is finished, protective gas 30 is blown into the soldering zone, where this protective gas has a temperature that imply forced condensation of the condensing vapours, and simultaneously therewith the shutting means 28 are closed so that further vapours are not supplied to the soldering zone. When the vapours are shut down, the gates 22 are opened, and the conveyor 14 provides for transporting the items 32 into the cooling zone. A conveyor 16 takes over here for further transport of the item 32 to be soldered while a controlled cooling takes place. A position sensor 68 provides for closing the gate 22, and when the conveyor 16 has advanced the item 32 to a position sensor 70, a gate 24 is opened. This remains open until the item has passed which is detected by sensor 72.

FIG. 3 shows a detail of a possible embodiment of soldering zone 6. The soldering zone 6 contains a conveyor 14 which runs between a gate 20 and a gate 22. A vessel 26 containing condensable vapours in liquid phase is covered by a shutting device 28, where the soldering zone contains a protective gas 30 blown in through a pipe 34, where an exhaustion 36 removes excess protective gas from the soldering zone 6. The soldering vessel 26 is heated by heating elements 40 that e.g. may electrically heated. The vessel 26 and heating elements 40 are surrounded by insulation material 42, and the upper part of the soldering zone is surrounded by insulation material 44. Perforated plates 50 and 52 lie over the vessel 26, where the perforated plates can be moved mutually by at least one actuator 54, whereby the shutting device 28 is formed. By using the optimal perforation pattern, up to 50% of the total area may be opened for through-flow of gas or vapours, whereas a very little movement of the plates 50, 52 by the actuator 54 may cause complete closing of the openings formed by the perforations.

In a soldering process, heating elements 40 are switched off and the shutting device 28 is closed simultaneously with protective gas is supplied through the pipes 34, where a item to be soldered, possibly placed on conveyor belt 14, is in principle flushed with protective gas until the oxygen concentration in the soldering section is sufficiently low, after which the inflow of protective gas is reduced and shutting device 28 is opened at the same time as more power is supplied to the heating elements 40. A strong vapour formation will hereby occur up through the soldering zone 6, and condensation of vapours will occur upon the item to be soldered, thereby heating the item until it reaches the desired soldering temperature. Before opening the gates again, one may advantageously supply protective gas in large amounts for completely removing the condensing vapours from the soldering zone by simultaneously closing the shutting device 28 and reducing the power supply in the heating elements 40, one may achieve that the condensing vapours are entirely removed at the time where gate 22 is opened. The protective gas might be recirculated through condensation means for vapour condensation and flux filtration.

FIG. 4 shows a possible embodiment of a shutting device 28 as seen from a first side. The device for shutting off 28 consists of two plates 50, 52 that have a number of conical holes 56, which are superposed opposite to each other in pairs so that through-going apertures are achieved. The lowermost plate includes a projection 58 that interacts with a recess 59. The plates 50, 52 may be displaced mutually, projections 58 and recess 59 ensuring a relative linear movement in one direction.

FIG. 5 shows the same embodiment as FIG. 4, but seen from the other side, where the same reference numbers are used. It appears from FIG. 5, that the upper plate 52 may be displaced to the left whereby the apertures 56 are closed.

FIG. 6 shows the same embodiment as FIGS. 4 and 5, but seen from above. From this appears that the plate 52 may be moved to the left in relation to the plate 50 whereby the holes 56 are shut off.

FIG. 7 shows a cut through a possible embodiment of a shutting device 100, which comprises three plates 102, 104, 106. Each of the plates 102, 104, 106 comprises holes 108, 110, 112. These three holes form a through-going opening between a volume over the plates and the volume under the plates.

FIG. 8 shows the same embodiment as FIG. 7, but with the valve mechanism closed. It is from FIG. 8 seen that the plate 104 is moved with reference to the plates 102 and 106. In this manner a misalignment between the openings 108, 110, and 112 is achieved hereby the shutting device 100 is closed.

It is possible to build the shutting device 100 with the plates 102 and 106 as fixed plates, where only the plate 104 is movable, which means that plate 104 could be in mechanical connection to an actuator device not shown. Depending on the shape of the holes 108, 110, and 112 only a limited movement of the plate 104 is necessary for opening a relatively large area through the shutting device 100. The shape of the holes 108, 110, 112 can have any possible form, and perhaps even specially designed holes would perform a good closing mechanism with a minimal movement of the plate 104. Circular holes are a possible solution, but other geometrical shapes of holes 108, 110, and 112 might by better.

FIG. 9 shows a cross-section of a soldering zone 202 having a tray (not shown) below the soldering zone and comprising heating elements for evapouration of medium 204 that evapourates and forms a vapour 206 that partly fills the soldering zone. The soldering zone comprises a conveyor belt 208 on which a device 210, e.g. a printed circuit board, is seen. The soldering zone is limited by the doors 212 and 214 which are shown as being closed, and at the bottom of the soldering zone, a steam valve 216 is shown which valve 216 in an open state forms a large number of small holes which open passage of vapour generated from the boiling liquid below. Above the steam valve 216, a screen 218 has been placed, primarily for collecting components falling off from printed circuit boards 210 during the soldering process. In order not to contaminate or destroy the valve 216, a closed circuit 220 for purifying the vapour 206 is provided. The closed circuit 220 comprises an inlet 222 connected with at least one tube 224 leading to a flange 226 from which the vapour 206 and flux or other gasses 260 enters a chamber 228 where a first condensing unit 230 is placed. Below the unit 230 a filter screen 232 is placed for collecting liquefied or solidified particles. Further in the flow direction of the vapour 206 and flux or other gasses 260 a second condensing unit 234 is placed. Below this condensing unit 234 a filter screen 236 is placed for collecting liquid or solidified particles. Further in the flow direction of the vapour 206 or gases, a heating element 238 is placed, which element is formed in the same way as the condensing units. Below the heating element 238 a filter screen 240 is placed for collecting liquid particles. After passing the heating element 238, gases enter a chamber 242 from which a tube 244 leads to a blowing unit 246 which blowing unit returns gases 260 to the soldering zone via an inlet 248. The condensing units 230 and 234 can be made as heat exchangers 250 and 252. The heating element 238 can also be made as a heat exchanger 254. The vapour 206 can be mixed with a protective gas 260 which passes through the whole unit 220 mixed up with the content of vapour, flux and other gasses. The heat exchanger 250 and 252 may comprise cooling fins 262 and 264 tilted against the flow direction. The heat exchanger 252 also contains fins 266 tilted against the flow direction. The surfaces in contact with the solder heating media can be coated with a material which having ability not to fix liquid or solidified flux.

In operation, a printed circuit board 210 is heated by evapourated solder heating medium 204 forming a vapour 206. During the soldering process, the blowing means 246 are not in operation. Thus vapour 206 rises from the underlying tray where a heating element is in operation for producing the vapour 206. At the beginning, the vapour 206 will condense when contacting the printed circuit board 210, but this condensation leads to a temperature rise on all the surfaces of the printed circuit boards 210 up to a temperature at which the soldering process takes place. When the soldering process is completed, which takes only a few seconds after reaching the correct temperature, a blower unit 246 is started, and protective gases 260 are led into the chamber. The gases have a temperature below the condensation temperature of the vapour 206. This leads to rapid condensation of vapour 206 which drops down on the steam valve 216 through which it passes as a liquid to the tray below. A large part of the vapour 206 is discharged through the outlet 222 and the tube 224, and led into the chamber 228 where the vapour passes through the condensing units 230 and 234. The content of evapourated flux and vapour 206 is totally condensed when it has passed these two condensation units 230 and 234, but the protective gas 260 continues through the heating element 254 and is preheated before it is once again sent through the blowing unit 246. Not until the major portion of the vapour 206 has been removed from the soldering chamber, are the printed circuit boards 210 removed through a door 212 that can be opened. Afterwards another door 214 can be opened and the next printed circuit board 210 can be led into the soldering zone. In practice, depending on the sizes of the printed circuit boards 210, several boards 210 can be soldered simultaneously in the soldering zone.

FIG. 10 shows the closed circuit 220 seen from above. Inlet tubes 224 are shown at the top of the figure together with inlet flanges 226 leading to the inlet chamber 228 containing a mixture of vapour 206 and protective gas 260. Afterwards this mixture of gasses passes through the condensing unit 230. Below the condensing unit 230 a filter screen 232 is placed. Further in the flow direction of the gas, a second condensing unit 234 is placed below which a filter screen 236 is placed. The gas is led through the heating element 238 below which a filter screen 240 is placed. The protective gas 260 enters the chamber 242 from which conduits 244 lead to blowing units 246.

FIG. 11 shows a closed circuit 320 containing a vapour 306 and a protective gas 360. At the bottom a collector tray 356 is placed from which an outlet 358 leads to a flux trap 322 comprising steps 324 where vapour 306 after condensation forms solder heating liquid 104 which flows over the steps 324 of the trap to an outlet 328 where the entire trap is cooled by cooling means 326, where the now cooled and purified solder heating medium 304 via an outlet 330 is returned to the soldering zone. In the flux trap 322 liquid fluxes is heavier than the liquid solder heating media, and the flux is mostly flowing under the liquid solder heating media 304, where the flux is in contact with the steps 324. Flowing down the steps the temperature of the steps 324 is decreased downwards, and the flux is solidified during the passage of the steps 324, but solidified flux is forming glue which is retracted to steps 324. A cleaning of the steps 324 is necessary as part of normal maintains of the soldering machine.

The invention claimed is:

1. A soldering apparatus, preferably for soldering items that have been applied a soldering agent, where the soldering apparatus includes at least one soldering zone, where the soldering zone includes means for generating vapour, the apparatus being adapted to heat the items to be soldered to a temperature required for soldering by condensing the vapour, and where the soldering zone includes gates, where the soldering zone contains a protective gas, wherein the soldering zone includes means for shutting off the vapour generating means, wherein the soldering zone includes a vessel to be heated by at least one heating element, wherein the vessel is covered by the means for shutting off, including at least one fixed perforated plate that interacts with at least one displaceable perforated plate which is displaceable by at least one actuator, and wherein the soldering zone is adapted for supplying means for forced condensing of the vapour in the soldering zone at the end of a soldering process.

2. A soldering apparatus according to claim 1, wherein the apparatus is arranged to supply protective gas through ducts to the soldering zone at the start of a soldering process, the supplying of protective gas being effected in dependence of a measurement of the actual oxygen content in the soldering zone.

3. A soldering apparatus according to claim 1, wherein the apparatus is provided with suction facilities for removing condensing vapour and protective gas corresponding to the supplied amount of protective gas from the soldering zone, wherein the apparatus is adapted for supplying protective gas at a regulated temperature lower than the soldering temperature in the soldering zone for achieving forced condensing of the condensing vapour, wherein the apparatus is adapted to supply protective gas to the soldering zone at a first high temperature at the end of a soldering process, where the temperature is approached a second lower temperature over a period of time.

4. A soldering apparatus according to claim 3, wherein the apparatus is adapted for forced condensation by use of recirculation through condensing means and through means for flux filtration.

5. A soldering apparatus according to claim 1, wherein the apparatus is adapted to have the means for shutting off the vessel closed until the start of a soldering process, wherein at least one heating element may be activated at the start of the soldering process simultaneously with opening the means for shutting off the vessel, where the apparatus is adapted for closing the means for shutting off the vessel simultaneously with regulating the means for heating by ending a soldering process.

6. A soldering apparatus according to claim 5, wherein the apparatus includes a preheating zone for preheating items to be soldered to a predetermined temperature, wherein the soldering apparatus includes at least one gate between the preheating zone and the soldering zone, wherein the preheating zone includes at least one gate at its entrance where the preheating zone is supplied with protective gas, wherein suction facilities from the preheating zone reduces the oxygen content in the preheating zone.

7. A soldering apparatus according to claim 6, wherein the apparatus includes at least one cooling zone, wherein the apparatus includes at least one gate between the soldering zone (6) and the cooling zone, and that the cooling zone includes at least one gate at the exit.

8. A soldering apparatus according to claim 7, wherein the soldering apparatus includes means for determining the position of the items to be soldered, wherein the opening and closing functions of the gates of the apparatus can be determined from the position of the items and the actual conditions in the zones of the apparatus.

9. A soldering apparatus according to claim 1, wherein the apparatus further comprises means for condensation of a vapour containing flux, wherein pumping means circulate the vapour containing flux through the condensation means, wherein the condensation means comprise a heat exchanger for cooling the vapour for flux and vapour condensation, wherein said pumping means are stopped during the soldering process, and started upon ending a solder process, wherein the pumping means operate in a closed circuit starting at an outlet from the soldering process and ending at an inlet to the soldering process, wherein the closed circuit comprises at least a first heat exchanger operating at a first temperature, and at least a second heat exchanger operated at a second lower temperature, wherein the heat exchangers are placed in conjunction with liquid collecting means.

10. An apparatus according to claim 9, wherein the closed circuit also comprises at least one heat exchanger for heating protective gas to a temperature below the condensing temperature of the vapour before the protective gas is returned to the soldering device in a time period after soldering is finished.

11. An apparatus according to claim 10, wherein liquefied solder heating medium is returned from the liquid collecting means through a conduit to a flux trap comprising steps, which flux trap is cooled by cooling means, first to a temperature for condensation and subsequently further cooled to a temperature for flux liquefying.

12. An apparatus according to claim 11, wherein the heat exchangers comprise cooling fins that are tilted against the inlet direction in order to return liquefied solder heating medium and liquefied or solidified flux, wherein protective gas passes over and around the fins.

13. An apparatus according to claim 12, wherein liquefied solder heating medium and liquefied or solidified flux passes filter means before reaching collecting means, which filter means collect liquid or solidified flux and other unwanted chemical substances.

14. An apparatus according to claim 13, wherein liquid solder heating medium is collected at the surface of a tray placed under the soldering zone and led over the flux trap.

15. An apparatus according to claim 14, wherein surfaces on elements in contact with flux are coated with a material having ability not to fix liquid or solidified flux.

16. An apparatus according to claim 15, wherein the pressure in the soldering zone is reduced at the beginning of a soldering process, wherein the pressure is partly normalised by opening a valve for supply of protective gas into the soldering zone, wherein the pressure in the soldering zone is normalized by opening for supply of vapour.

17. A method for soldering in which items to be soldered are applied a soldering agent in advance, wherein the items are preheated in a first step, wherein the items are soldered in a second step in that condensing vapour heats the items to a temperature, which is higher than the melting point of the soldering agent, wherein the soldering items are cooled in a third step subsequent to soldering, wherein the second step is effected in the presence of a protective gas, wherein the second step includes shutting off the supply of vapour and forced condensing of vapour, wherein a vessel is heated in the soldering zone by at least one heating element, and wherein the vessel is covered by means for shutting off the vapour using at least one fixed perforated plate which interacts with at least one displaceable perforated plate that is displaced relative thereto by at least one actuator.

18. A method according to claim 17, wherein the supplying of protective gas is used as means for forced condensing of vapour.

19. A method according to claim 18, wherein the method comprises flux deposition in conjunction with vapour phase soldering, which soldering process leads to evapouration of flux and other chemical substances, wherein the vapour of solder heating medium containing flux and other chemical substances is drawn into a closed circuit in time periods between or after soldering processes, wherein the closed circuit comprises at least a first condensation process and a second condensation process, which first and second condensation processes take place at a first high temperature and at a second lower temperature, and wherein liquid solder heating medium is returned to the vapour phase soldering process.

20. A method according to claim 19, wherein the first temperature depends on the condensation temperature of the flux, wherein the second temperature depends on the condensation temperature of the solder heating medium.

21. A method according to claim 20, wherein the protective gas is heated by heating means to a temperature below the condensation temperature of the vapour after it has passed through the condensing processes and before the protective gas is returned to the soldering chamber, which condensing processes and the heating process take place in time periods after soldering of the elements.

22. A method according to claim 21, wherein the condensed heating medium is returned to the process, wherein it is led through a flux depositing trap, which trap comprises a cooling process for flux condensation and flux solidification.

* * * * *